(12) United States Patent
Sasaki

(10) Patent No.: US 7,724,617 B2
(45) Date of Patent: May 25, 2010

(54) OPTICAL HEAD DEVICE

(75) Inventor: Masaki Sasaki, Nagano (JP)

(73) Assignee: Nidec Sankyo Corporation (JP)

( * ) Notice: Subject to any disclaimer, the term of this patent is extended or adjusted under 35 U.S.C. 154(b) by 422 days.

(21) Appl. No.: 11/854,134

(22) Filed: Sep. 12, 2007

(65) Prior Publication Data

US 2008/0062435 A1  Mar. 13, 2008

(30) Foreign Application Priority Data

Sep. 12, 2006  (JP) .............................. 2006-247273

(51) Int. Cl.
*G11B 7/00* (2006.01)

(52) U.S. Cl. .............. 369/44.23; 369/44.25; 369/44.28; 369/44.37; 369/112.23; 369/112.13

(58) Field of Classification Search ........................ None
See application file for complete search history.

(56) References Cited

U.S. PATENT DOCUMENTS 6,785,215 B2 * 8/2004 Yamanouchi et al. .. 369/112.23
7,133,350 B2 * 11/2006 Aiki ....................... 369/112.01
7,319,644 B2 * 1/2008 Nishi ....................... 369/44.42

FOREIGN PATENT DOCUMENTS

| JP | 2003-272218 | 9/2003 |
|----|-------------|--------|
| JP | 2006-24276 | 1/2006 |

* cited by examiner

*Primary Examiner*—Muhammad N. Edun
(74) *Attorney, Agent, or Firm*—Cantor Colburn LLP

(57) ABSTRACT

An optical head device may include a twin laser light source which is integrally provided with a first laser beam emitting element and a second laser beam emitting element, a light receiving element, and an optical system including an objective lens for converging a laser beam on an optical recording medium. The optical system is provided with a detection lens structured of a toric lens. The toric lens applies an astigmatic difference caused by a toric face to the one of the return light beams, and the toric lens applies the other of the return light beams an astigmatic difference caused by a toric face and astigmatism composed of astigmatism and curvature of image field caused by passing off-axis position to coincide a focusing position of the first laser beam with that of the second laser beam.

2 Claims, 3 Drawing Sheets

OPTICAL HEAD DEVICE

CROSS REFERENCE TO RELATED APPLICATION

The present invention claims priority under 35 U.S.C. §119 to Japanese Application No. 2006-247273 filed Sep. 12, 2006, which is incorporated herein by reference.

FIELD OF THE INVENTION

An embodiment of the present invention may relate to an optical head device which includes a twin laser light source provided with two laser beam emitting elements which emit laser beams with different wavelengths.

BACKGROUND OF THE INVENTION

An optical head device which is capable of reproducing and recording information from and in different types of an optical recording medium (optical disk) such as a CD and a DVD is, for example, structured such that a twin laser light source is used which is provided with a first laser beam emitting element and a second laser beam emitting element which emit laser beams with different wavelengths. When the twin laser light source is used, two laser beams are passed through an approximately common optical path. Therefore, since an optical path composite element is not required, the number of parts is reduced and thus cost can be reduced (see, for example, Japanese Patent Laid-Open No. 2003-272218 and Japanese Patent Laid-Open No. 2006-24276).

However, in an optical head device provided with a twin laser light source, when a focusing error signal is to be detected by an astigmatism method, there are the following problems.

When wavelengths are different, axial chromatic aberration of a lens is occurred. On the other hand, an optimal position of each of the optical elements is determined by its wavelength. Therefore, when a plurality of laser beam emitting elements is provided for respective wavelengths, defocus adjustments are required to be performed by optimizing positions of the light emitting elements and other optical elements for respective wavelengths. However, when a twin laser light source is used, since two laser beam emitting elements are integrated with each other, defocus adjustment by utilizing the above-mentioned method is unable to be performed.

Further, in order to enhance qualities of reproducing and recording, a detection lens is sometimes disposed before a light receiving element. However, when the twin laser light source is used, in addition to the problem of the above-mentioned axial chromatic aberration, two laser beam emitting elements are disposed apart about 110 μm from each other. Therefore, the optical axis of a return light beam of at least one of the laser beams is located at an off-axis position of the detection lens and thus curvature of image field is occurred.

Accordingly, when the twin laser light source is used, a difference between focus error offsets of the respective wavelengths becomes large and thus a servo-control is not performed satisfactory to cause signal quality to reduce.

SUMMARY OF THE INVENTION

In view of the problems described above, an embodiment of the present invention may advantageously provide an optical head device in which focusing positions of return light beams of two laser beams to a light receiving element are capable of being coincided with each other even when a twin laser light source is used.

Thus, according to an embodiment of the present invention, there may be provided an optical head device including a twin laser light source which is provided with a first laser beam emitting element for emitting a first laser beam and a second laser beam emitting element for emitting a second laser beam whose wavelength is different from a wavelength of the first laser beam, a light receiving element, and an optical system including an objective lens. The optical system is structured so as to converge a laser beam which is emitted from the twin laser light source on an optical recording medium through the objective lens, and to guide a return light beam of the first laser beam and a return light beam of the second laser beam reflected by the optical recording medium to the light receiving element. Further, the optical system is provided with a detection lens which is disposed before the light receiving element to apply astigmatic difference to the return light beam for detecting a focusing error signal by an astigmatism method. In addition, an optical axis of one of the return light beams of the first laser beam and the second laser beam is located on an axis of the detection lens, and an optical axis of the other of the return light beams is located off-axis of the detection lens. Further, the detection lens is a toric lens, and the toric lens applies an astigmatic difference caused by a toric face to the one of the return light beams, and the toric lens applies the other of the return light beams an astigmatic difference caused by a toric face and astigmatism composed of astigmatism and curvature of image field caused by passing through off-axis position to coincide a focusing position of the return light beam of the first laser beam with a focusing position of the return light beam of the second laser beam.

In accordance with an embodiment of the present invention, while a twin laser light source is used, a toric lens is used as the detection lens. The toric lens applies an astigmatic difference caused by a toric face to the one of the return light beams, and applies the other of the return light beams an astigmatic difference caused by a toric face and astigmatism composed of astigmatism and curvature of image field cause by passing through off-axis position. In this manner, a difference of the astigmatic difference which is applied to the one of the return light beams is canceled by the detection lens. Therefore, focusing positions of the return light beams of the first laser beam and the second laser beam can be coincided with each other. Accordingly, in a case when a twin laser light source is used, even when positions of the light emitting elements and other optical elements cannot be optimized for both wavelengths and, in addition, the optical axis of the other of the return light beams is located on an off-axis position of the detection lens, a difference between focus error offsets of the return light beams of the first laser beam and the second laser beam becomes small.

In accordance with an embodiment of the present invention, a direction of the astigmatic difference applied to the return light beam of the first laser beam and a direction of the astigmatic difference applied to the return light beam of the second laser beam are matched with a formed pattern of a divided light receiving face of the light receiving element by radius of curvature of the toric face and rotational angular position around an optical axis of the toric lens. For example, a direction of astigmatic difference applied to the return light beam of the first laser beam and a direction of astigmatic difference applied to the return light beam of the second laser beam can be set in a direction which is inclined at 45° with respect to the divided lines of the divided light receiving face of the light receiving element for signal detection. According to the structure as described above, satisfactory focus error signals for both the return light beam of the first laser beam and the return light beam of the second laser beam can be obtained.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

An optical head device in accordance with an embodiment of the present invention will be described below with reference to the accompanying drawings. In the following description, a disposed side of an objective lens is defined as an upper face side and its opposite side is defined as an under face side.

Figure 1B:
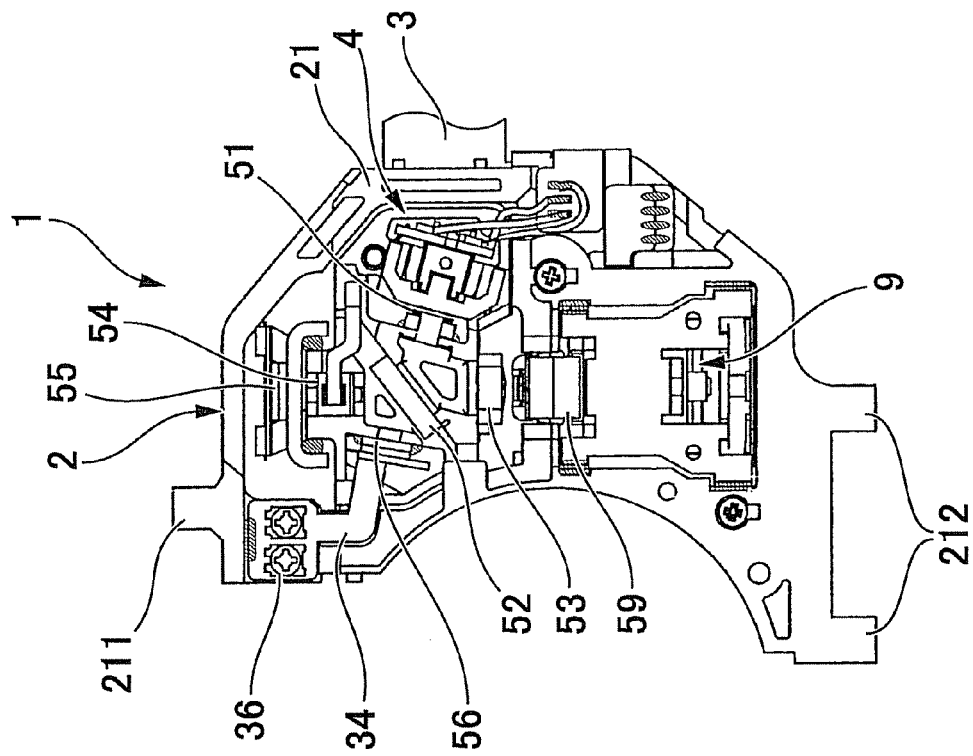
FIG. 1(b) is its bottom view.
Figure 1A:
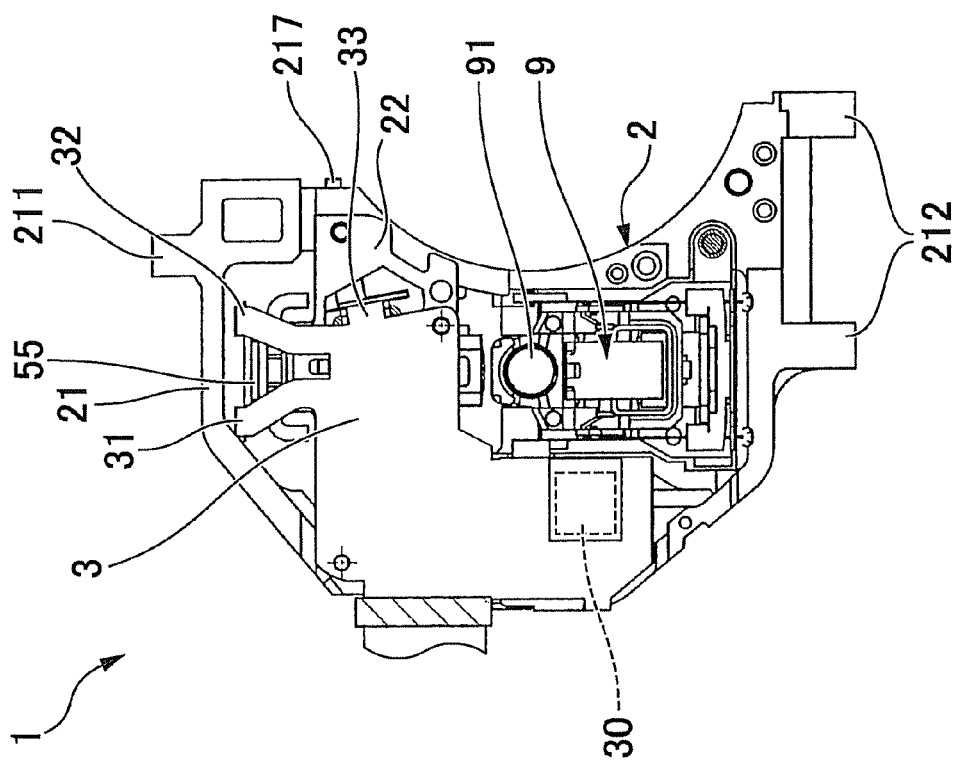
FIG. 1(a) is a plan view showing an optical head device in accordance with an embodiment of the present invention in a state that an upper cover, an under cover and an actuator cover are detached

FIG. 1(a) is a plan view showing an optical head device in accordance with an embodiment of the present invention in a state that an upper cover, an under cover and an actuator cover are detached, and FIG. 1(b) is its bottom view.

As shown in FIGS. 1(a) and 1(b), in an optical head device 1 to which the present invention is applied, both respective ends of a device frame 2 are formed with a first bearing part 211 and a second bearing part 212 which engage with a guide shaft and a feed screw shaft (not shown) of a disk drive device and the optical head device 1 is driven in a radial direction of an optical disk. An one side face of the device frame 2 is recessed in a roughly circular arc shape to prevent interference with a spindle motor (not shown) of the disk drive mechanism when the device frame 2 has been moved near the spindle motor.

An objective lens 91 is disposed at a roughly center position on an upper face side of the device frame 2 and a flexible printed circuit board 3 is flatly disposed on the upper face side. A driving IC 30 (drive circuit) is mounted on an under face of the flexible printed circuit board 3 for driving a twin laser light source 4 and the like and for controlling an objective lens drive mechanism 9 and the like, which will be described below. Wiring patterns formed on end parts 31 and 32 of the flexible printed circuit board 3 is electrically connected to a light receiving element 55 for signal detection. The flexible printed circuit board 3 is also provided with end parts 33 and 34 which are connected to the twin laser light source 4 and a light receiving element 56 for front monitor, and a volume 36 is mounted on an end portion of the end part 34. The device frame 2 includes a mainframe 21 and a metal sub-frame 22 which is held by the mainframe 21 in a state that the sub-frame 22 is disposed in the inside of the mainframe 21.

Figure 2:
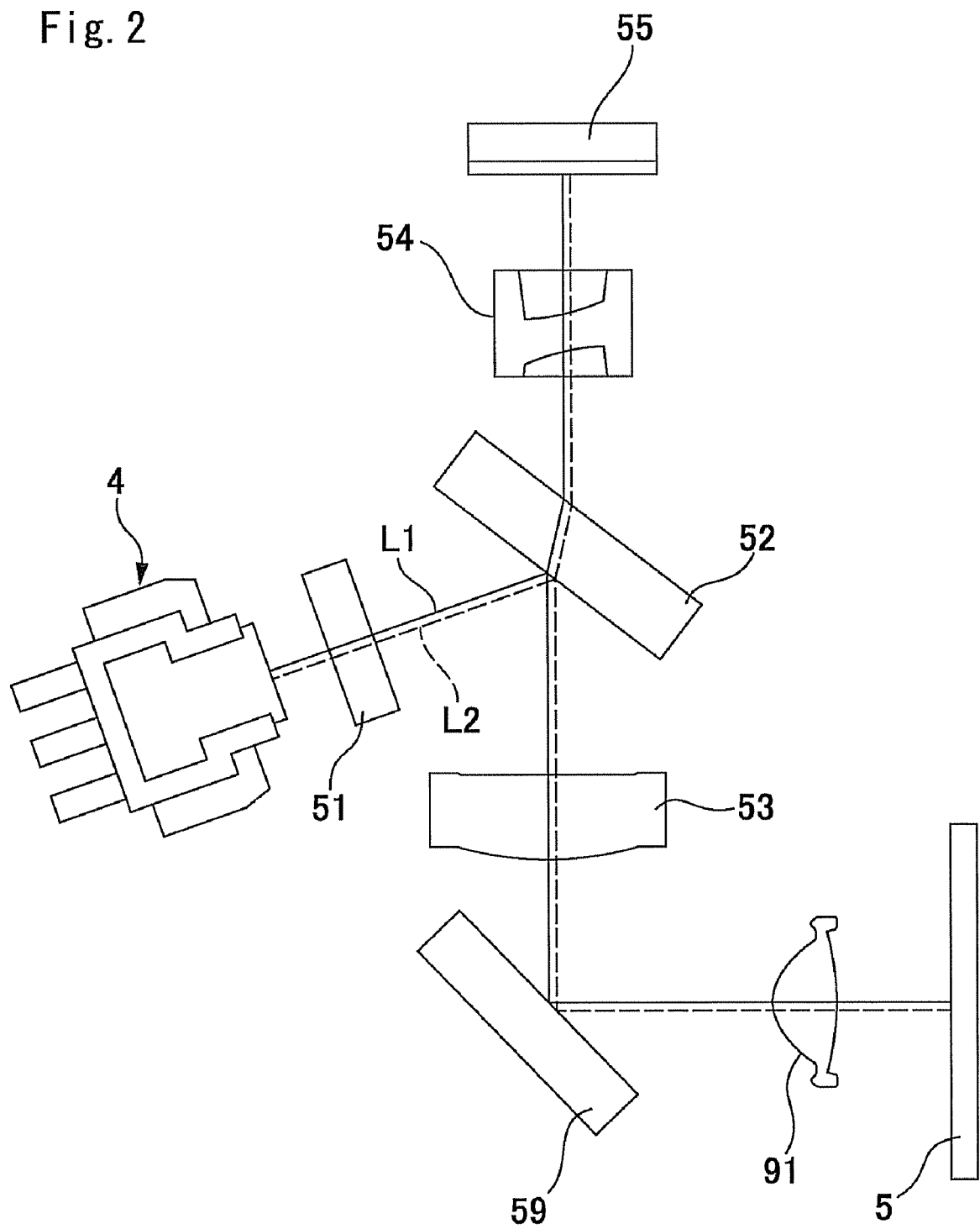
FIG. 2 is an explanatory view showing an optical system which is used in the optical head device shown in FIGS. 1(a) and 1(b).

FIG. 2 is an explanatory view showing an optical system which is used in the optical head device shown in FIGS. 1(a) and 1(b). As shown in FIG. 2, the optical head device 1 is a two-wavelength optical head device which is capable of recording and reproducing information into and from a CD system disk or a DVD system disk by using a first laser beam "L1" with a wavelength of 650 nm band (infrared light) and a second laser beam "L2" with a wavelength of 780 nm band (out of infrared light). The twin laser light source 4 which is integrally provided with a laser diode of AlGaInP system (first laser beam emitting element) which emits the first laser beam "L1" and a laser diode of AlGaAs system (second laser beam emitting element) which emits a second laser beam "L2" is mounted on the device frame 2. The first laser beam "L1" and the second laser beam "L2" are guided to a DVD system disk or a CD system disk which is an optical disk through a common optical system including the objective lens 91. Optical elements which structure the optical system are mounted on the device frame 2. Further, return light beams from an optical disk (return light beams of the first laser beam "L1" and the second laser beam "L2") are guided to the common light receiving element 55 for signal detection through the common optical system. Optical elements defining the optical path for the return light beam and the light receiving element 55 for signal detection are also mounted on the device frame 2.

The common optical system in the optical head device 1 in this embodiment includes a diffraction element 51 for diffracting the first laser beam "L1" and the second laser beam "L2" which are emitted from the twin laser light source 4 into three beams for tracking detection, a half mirror 52 which partially reflects the three laser beams which are divided by the diffraction element 51, a collimating lens 53 which forms the laser beam from the half mirror 52 to be a parallel light, a directing mirror 59 which directs the parallel light to the optical disk, and the objective lens 91 which converges the laser beam from the directing mirror 59 on a recording face of an optical disk 5 (optical recording medium). The common optical system also includes the light receiving element 55 for signal detection which receives return light beams of the first laser beam and the second laser beam that are passed through the collimating lens 53 and the half mirror 52 after having reflected by the recording face of the optical disk. A light receiving element 56 for front monitor is disposed on an opposite side to the diffraction element 51 with respect to the half mirror 52.

In the optical head device 1 structured as described above, detection of a focusing error signal is performed by an astigmatism method (differential astigmatism method is included). Therefore, a light receiving face of the light receiving element 55 for signal detection is formed in a four-divided light receiving face for a main beam and sub-beams. Further, the common optical system is provided before the light receiving element 55 for signal detection with a detection lens 54 which applies astigmatic difference to the return light beams of the first and the second laser beams "L1" and "L2".

A position of the objective lens 91 in a tracking direction and a focusing direction is servo-controlled by an objective lens drive mechanism 9. The objective lens drive mechanism 9 is also mounted on the device frame 2. In this embodiment, a wire suspension type of objective lens drive mechanism 9 is used, which is well-known and thus a detail description is omitted. The objective lens drive mechanism 9 is provided with a lens holder which holds the objective lens 91, a holder support part which movably supports the lens holder in a tracking direction and a focusing direction with a plurality of wires, and a yoke which is fixed to the device frame 2. Further, the objective lens drive mechanism 9 is provided with a magnetic-drive circuit which is structured of drive coils attached to the lens holder and drive magnets attached to the yoke. The objective lens 91 held by the lens holder is driven in the tracking direction and the focusing direction with respect to an optical recording medium by controlling energization to the drive coils. Further, the objective lens drive mechanism 9 is capable of performing a tilt control for adjusting an inclination of the objective lens 91 in a jitter direction.

In the optical head device 1 structured as described above, the first and second laser beams "L1" and "L2" emitted from the twin laser light source 4 have transmitted through the diffraction element 51. After that, a part of the laser beam is reflected by a partially reflecting face of the half mirror 52 and its optical axis is bent about 90 degrees to direct the collimating lens 53. The optical axis of the laser beam which is formed in a parallel light beam by the collimating lens 53 is bent 90 degrees by the directing mirror 59 to direct the objective lens 91. In this case, parts of the first and second laser beams "L1" and "L2 emitted from the twin laser light source 4 are transmitted through the partially reflecting face of the half mirror 52 to be guided to a light receiving element 56 for front monitor as a monitor light beam. A monitored result in the light receiving element 56 for front monitor is fed back to the twin laser light source 4 through a driving IC 30 and intensity of the laser beam emitted from the twin laser light source 4 is controlled.

The return light beam from the optical recording disk 5 is returned through the objective lens 91 and the directing mirror 59 in a reverse direction and is emitted to the detection lens 54 through the collimating lens 53 and the half mirror 52. After elimination of coma aberration and adjustment of astigmatic difference are performed by the detection lens 54, the return light beam is incident on the light receiving element 55 for signal detection to be detected. The return light beam detected by the light receiving element 55 for signal detection includes three beams which are formed by the first laser beams "L1" and the second laser beam "L2" diffracted by the diffraction element 51. For example, reproduction of a signal is performed by a main beam of the three beams comprised of a zero-order light beam and detection of a tracking error signal of the objective lens 91 is performed by using detection results of sub-beams comprised of ±1st-order diffracted lights. Further, in the astigmatism method, a focusing error signal of the objective lens 91 is detected by an astigmatism signal obtained from the main beam. Alternatively, in the differential astigmatism method, a focusing error signal of the objective lens 91 is detected by an astigmatism signal obtained from the main beam and the sub-beams. The driving IC controls the objective lens drive mechanism 9 on the basis of detected results of the tracking error signal and the focusing error signal which are obtained as described above.

As described above, in this embodiment, recording and reproduction are performed by the first laser beam and the second laser beam through the common objective lens 91. Therefore, a two-wavelength lens on which grating is formed with concentrically circular shaped grooves and step portions is used as the objective lens 91. Accordingly, according to this embodiment, the objective lens 91 can be commonly used for optical recording disks which are provided with recording layers whose thicknesses of surface protective layers are different from each other with the use of the first laser beam and the second laser beam.

As described with reference to FIGS. 1 and 2, the twin laser light source 4 is used in the optical head device 1 in this embodiment. Therefore, two laser diodes are disposed with about 110 μm apart from each other and thus the optical axis of the first laser beam "L1" and the optical axis of second laser beam "L2" are also apart with about 110 μm from each other. Accordingly, although an optical axis of the return light beam of the first laser beam "L1" is located on the axis of the detection lens 54, an optical axis of the return light beam of the second laser beam "L2" is located at an off-axis position of the detection lens 54. This relation is similar to other optical elements.

Therefore, in this embodiment, a toric lens whose both sides are formed in a toric face is used as the detection lens 54. In accordance with an embodiment, the detection lens 54 is disposed so as to be obliquely inclined with respect to an optical axis of the device to correct coma aberration which is occurred when the return light beam of the first laser beam "L1" and the return light beam of the second laser beam "L2" are obliquely transmitted as a convergence light through the parallel flat plate-shaped half mirror 52.

The detection lens 54 applies an astigmatic difference generated by the toric face to the return light beam of the first laser beam "L1" to be capable of detecting a focusing error signal by the astigmatism method.

On the other hand, the detection lens 54 applies an astigmatic difference which is generated by the toric face and an astigmatism, which is composed of astigmatism and curvature of field which are generated by passing through the off-axis position, to the return light beam of the second laser beam "L2" to be capable of detecting a focusing error signal by the astigmatism method. Further, an astigmatic difference is applied to the return light beam of the second laser beam "L2" by the detection lens 54 to coincide a focusing position of the return light beam of the second laser beam "L2" with a focusing position of the return light beam of the first laser beam "L1".

Specifically, for example, the astigmatism which is occurred before the return light beam has reached to the detection lens 54 is corrected by the toric face on an incident side of the detection lens 54 and then, an astigmatic difference required to detect a focusing error signal by the astigmatism method is applied by the toric face on a light-emitting side of the detection lens 54.

Further, a direction of the astigmatic difference applied to the return light beam of the first laser beam "L1" and a direction of the astigmatic difference applied to the return light beam of the second laser beam "L2" are matched with the formed pattern of the divided light receiving face of the light receiving element 4 for signal detection by the radius of curvature of the toric face and the rotational angular position around the optical axis of the detection lens 54.

Figure 3A:
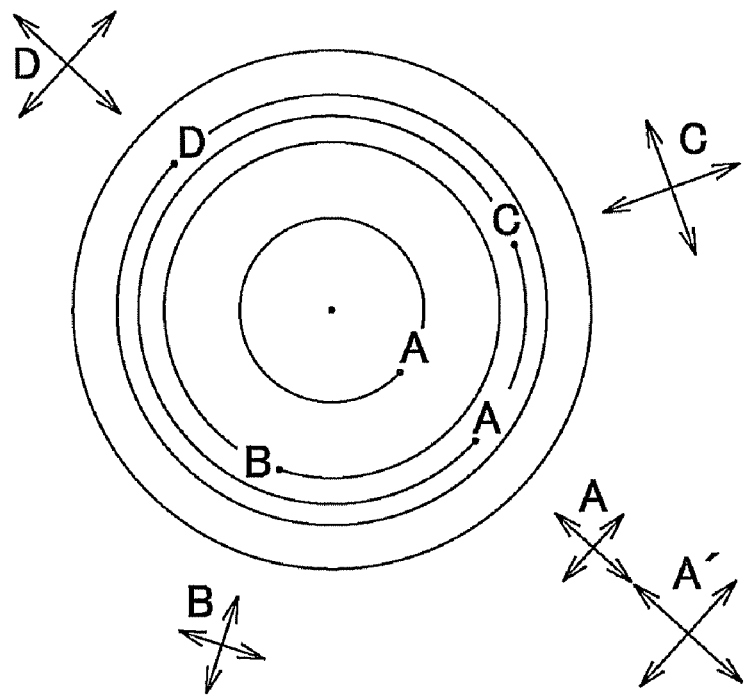
FIG. 3(a) is an explanatory view showing astigmatism which is occurred in a spherical lens and FIG. 3(b) is an explanatory view showing a toric lens.
Figure 3B:
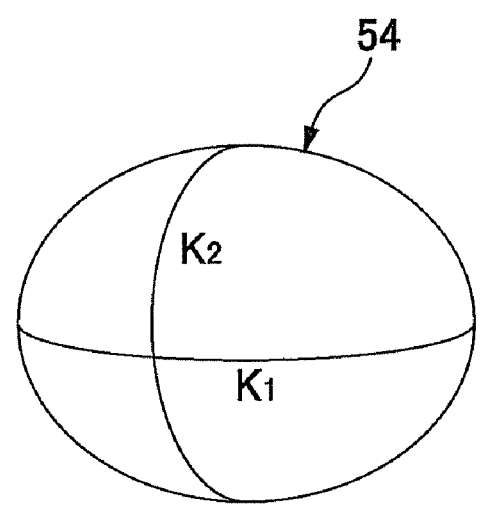

FIG. 3(a) is an explanatory view showing astigmatism occurring in a spherical lens and FIG. 3(b) is an explanatory view showing a toric lens. FIG. 3(a) shows a case that a spherical lens is used as the detection lens 54, and directions of astigmatisms which are generated when the return light beam of the second laser beam L2 has passed through respective positions "A", "A'", "B", "C" and "D" are shown as directions of arrows and their magnitudes are shown as lengths of the arrows. The magnitude of astigmatism caused by passing the off-axis position is defined by a distance from the lens center and the direction of the astigmatism is defined with by its angular position.

On the other hand, as shown in FIG. 3(b), in the toric lens which is used as the detection lens 54 in the optical head device 1 in this embodiment, radiuses of curvature of two principal meridians "K1" and "K2" of the toric face are different from each other. Therefore, a magnitude of astigmatism caused by passing the off-axis position of the return light beam of the second laser beam "L2" is capable of being varied by a distance from the lens center. In addition, a direction of astigmatism caused by passing the off-axis position of the return light beam of the second laser beam "L2" is capable of being varied by a distance from the lens center. Further, when a toric lens is used as the detection lens 54, a magnitude of astigmatism caused by passing the off-axis position of the return light beam of the second laser beam "L2" is capable of being also varied by an angular position on the lens, and a direction of astigmatism caused by passing the off-axis position of the return light beam of the second laser beam "L2" is capable of being also varied by an angular position on the lens.

In addition, the toric lens which is used as the detection lens 54 in this embodiment is a toric lens whose both faces are formed in a toric face. Therefore, an astigmatic difference which is applied when the return light beam of the second laser beam "L2" is passed through the off-axis of the detection lens 54 is capable of being set in an arbitrary magnitude and an arbitrary direction by shifting directions of the principal meridians "K1" and "K2".

Accordingly, the radiuses of curvature of the principal meridians "K1" and "K2" of the toric faces on both sides of the detection lens 54 are optimized and, in addition, the passing position of the return light beam of the second laser beam "L2" is optimized to apply an astigmatic difference which is corresponding to the astigmatic difference of the return light beam of the first laser beam "L1". As a result, a focusing position of the return light beam of the second laser beam "L2" is capable of being coincided with a focusing position of the return light beam of the first laser beam "L1" by the curvature of image field to the return light beam of the second laser beam "L2". Further, a direction of astigmatism applied to the return light beam of the first laser beam "L1" and a direction of astigmatism applied to the return light beam of the second laser beam "L2" are capable of setting in a direction which is inclined at 45° with respect to the divided lines of the divided light receiving face of the light receiving element 55 for signal detection.

As described above, in this embodiment, although the twin laser light source 4 is used, a toric lens is used as the detection lens 54. In addition, while the toric lens applies an astigmatic difference caused by the toric face to the return light beam of the first laser beam "L1" which is passed on the axis, the toric lens applies an astigmatic difference caused by the toric face and astigmatism composed of astigmatism and curvature of field caused by passing through the off-axis position to the return light beam of the second laser beam "L2". In this manner, the focusing positions of the return light beam of the first laser beam "L1" and the return light beam of the second laser beam "L2" are coincided with each other. Therefore, a difference between focus error offsets of the return light beams of the first laser beam "L1" and the second laser beam "L2" can be made small.

Further, in the toric lens used as the detection lens 54, the radius of curvature of the toric face is optimized and the rotational angular position around the optical axis is optimized to match a direction of the astigmatic difference applied to the return light beam of the first laser beam "L1" and a direction of the astigmatic difference applied to the return light beam of the second laser beam "L2" with the formed pattern of the divided light receiving face of the light receiving element 55 for signal detection. Accordingly, qualities of focus error signals to both the return light beams of the first laser beam "L1" and the second laser beam "L2" can be improved.

As described above, according to this embodiment, in a case that cost is reduced by using the twin laser light source 4, even when both of the first laser beam "L1" and the second laser beam "L2" are used, servo-control can be preferably performed to the objective lens 91 and thus a signal with a high degree of quality can be obtained.

In the embodiment described above, a toric lens is used whose both faces are formed in a toric face is used as the detection lens 54. However, a toric lens in which only one face is formed in a toric face may be used as the detection lens 54.

Further, in the embodiment described above, a parallel planar half mirror is used as an optical path separation element for separating the forward path directing from the twin laser light source 4 to an optical disk 5 from the return path directing from the optical disk 5 to the light receiving element 55 for signal detection. However, the present invention may be applied to a case that an optical path separation element formed in a prism shape is used.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical head device comprising:
   a twin laser light source which is integrally provided with a first laser beam emitting element for emitting a first laser beam and a second laser beam emitting element for emitting a second laser beam whose wavelength is different from a wavelength of the first laser beam;
   a light receiving element; and
   an optical system including an objective lens;
   wherein the optical system converges a laser beam which is emitted from the twin laser light source on an optical recording medium through the objective lens and guides return light beams of the first laser beam and the second laser beam reflected by the optical recording medium to the light receiving element;
   wherein the optical system is provided with a detection lens which is disposed before the light receiving element to apply astigmatic difference to the return light beams for detecting focusing error signals by an astigmatism method;
   wherein an optical axis of one of the return light beams of the first laser beam and the second laser beam is located on an axis of the detection lens, and an optical axis of the other of the return light beams is located off-axis of the detection lens;
   wherein the detection lens is a toric lens, and the toric lens applies an astigmatic difference caused by a toric face to the one of the return light beams, and the toric lens applies the other of the return light beams an astigmatic difference caused by a toric face and astigmatism composed of astigmatism and curvature of image field caused by passing off-axis position to coincide a focusing position of the return light beam of the first laser beam with a focusing position of the return light beam of the second laser beam.

2. The optical head device according to claim 1, wherein a direction of the astigmatic difference applied to the return light beam of the first laser beam and a direction of the astigmatic difference applied to the return light beam of the second laser beam are matched with a formed pattern of a divided light receiving face of the light receiving element by radius of curvature of the toric face and rotational angular position around an optical axis of the toric lens.

* * * * *